*NO PRINTED SPECIFICATION AVAILABLE*
1971X
A. SAWYER.
Grist Mill.
Patented July 20, 1813.
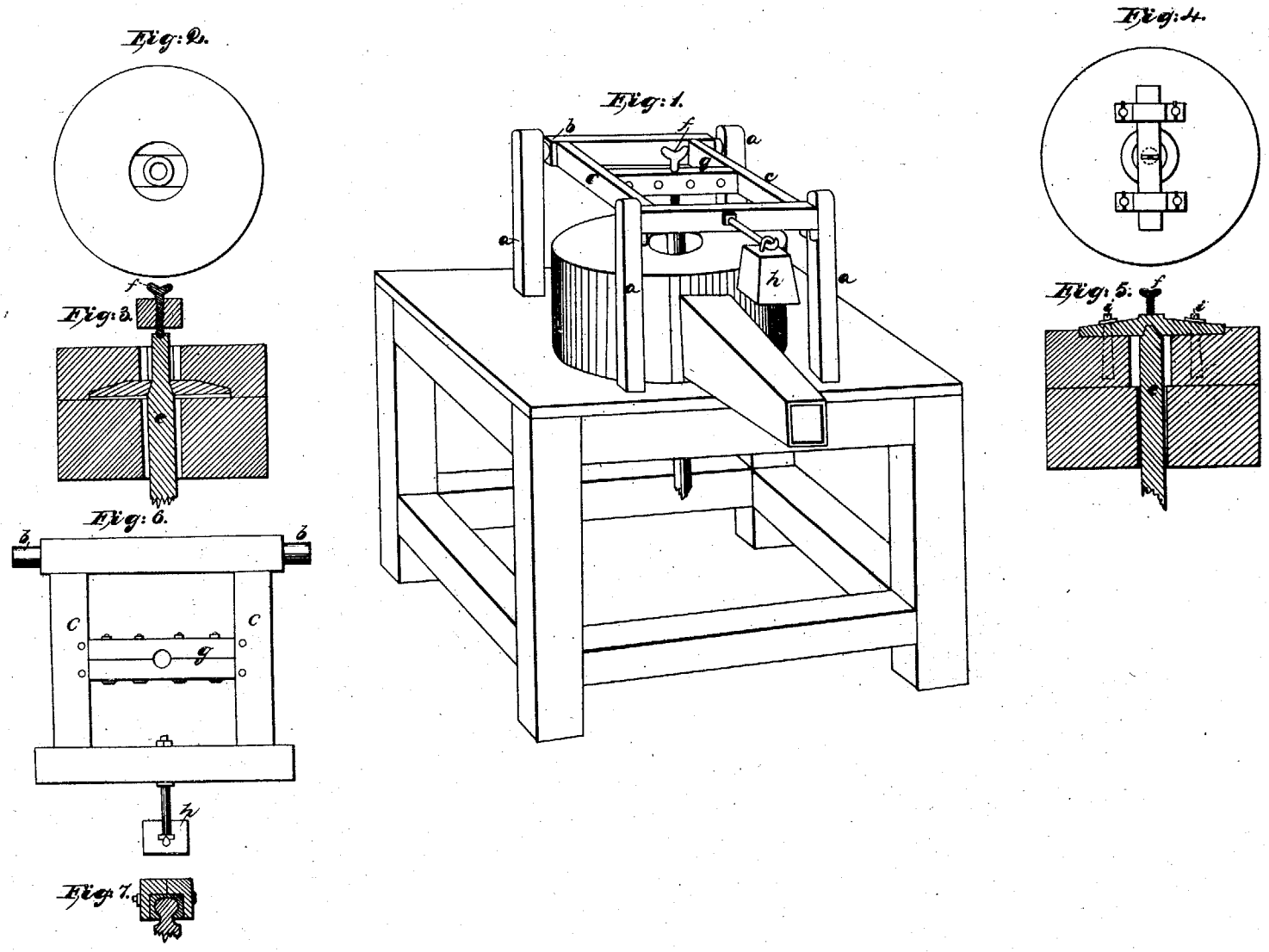

July 20 1815    1971X

Abraham Sawyer
Letters Patent

1

The Schedule referred to in these Letters Patent and making part of the
same containing a description in the words of the said Abraham Sawyer
himself of his improved Grist Mill.

The improvement consists prin-
cipally in the alteration of the Spindle used in the common Grist-
Mill. by lengthening or continuing the same through the horn[1] of
the mill to a frame just above the uppermost stone or runner. To
this frame the spindle is fastened, instead of being fastened in the
bed stone as formerly[2]. The frame is fastened by means of four
posts set fast in the building two on opposite sides of the Mill
stones — Into the posts on the back. [1] The horn of a Grist Mill
as now used is a straight piece of iron with a mortice through the
centre of the frame for the admission of the Spindle. This horn or iron
rests on a shoulder in the spindle & supports & turns the runner or
grinding stone — 2d The part of a grist mill most liable to injury
& which could not be repaired without taking up the mill. was
the fastening of the Spindle which turns the runner. The old mode
was to confine it by means of a box and wedges in the bed or bottom
stone below where the top of the spindle entered the horn which
turns the runner. This was frequently out of repair the wedges
were soon worn out; or the box burned up by the friction of the Spin
dle. This is entirely remedied by fastening the spindle above the
horn) side of the hopper (a little higher than the top of the runner) in-
sert a roller[3] or timber with round tenons — into this roller insert
two[4] sticks of timber of sufficient strength to keep the spindle steady.
These timbers are to be connected by cross bars at such a distance that
they will just fall between the other two posts — Let one of the cross
bars[5] come immediately over the eye of the mill stone; This bar is
to support the top of the spindle. The Spindle can be connected
with this cross bar several ways — The top can be round, and run

1971X in a mortise in the bar – or a screw of sufficient bigness with a steel
point can be fixed perpendicularly through the bar, which point
will stand in a socket or hollow in the top of the spindle – or the
spindle can be made – (3 The object of the roller is to permit the frame
to be turned back, when the mill is taken up. 4. The object of
two sticks is to support the hopper – In mills that will permit
two posts one on opposite sides of the stone with a beam across will
answer the purpose. 5 This bar will be better in two pieces and
fastened together with screws or keys and should be made of hard
wood or iron. 6 This socket will be better made in a piece of
hardened steel. & let into the top of the spindle –) in two pieces 7
the upper part affixed to the lower just above the horn. (sufficiently,
strong) with a socket in the top to meet the point of the screw.
A weight is affixed to the end of the frame which lies between the
posts of sufficient pressure to keep the same in its place and still
permit the frame to rise as the runner is raised and fall as it
is lowered. 8 — A further improvement can be had by fasten-
ing the horn to the top of the runner instead of the bottom. This is
done in the following manner. Drill mortices for the horn into
the top of the stone (say five or six inches) then mortices for two
bars of iron to lie across the ends of the horn with holes in each end
of the iron bars. these bars are to be fastened in their places with
bolts and keys as follows. (Drill four holes through the stone for
the – (7 This I think the better way, for by taking the top part
of the spindle off the runner can be taken up, without raising
it so high as in the other ways. If the latter mode is used
the top part of the spindle should be made eight square or flu-
ted to jar the grain from the shoe – In the other modes a piece
of wood should encircle the spindle for that purpose. 8 A mill
fixed in this way will run steady, and easy) and will be se-
cure from the jar and danger arising from the looseness of the
spindle, and from the heat occasioned by friction in the old
manner) bolts – These holes are to be larger at the bottom than
the

1971X he top so as to admit the heads of the bolts as far into the stone as
t will ever be worn. Then with keys through the top of these bolts
he iron bars are fastened down. In hanging a runner in this
manner, there must be washers or rings of iron to encircle the
spindle to keep the horn a proper distance from the shoulder
f the spindle which washers can be taken off as the stone wears
down.

Witnesses
Cephas J. Rockwood
Jesse H. Hosmer

Abraham Sawyer

Drawing made